United States Patent Office 2,961,712
Patented Nov. 29, 1960

2,961,712
METHOD OF MAKING FILLED POLYTETRA-
FLUOROETHYLENE ARTICLES

William J. Davis, West Reading, Pa., assignor to The Polymer Corporation, Reading, Pa., a corporation of Pennsylvania No Drawing. Filed July 10, 1957, Ser. No. 670,863

11 Claims. (Cl. 18—55)

This invention relates to the art of incorporating fillers in polyhaloethylene materials, and especially in polytetrafluoroethylene. The invention is concerned with an improved method for making filled polytetrafluoroethylene products or articles.

In describing the major purposes and advantages of the invention it is first mentioned that, as is well known, polytetrafluoroethylene has very low adhesion properties with respect to many other materials. In view of this, speaking generally, fillers incorporated in polytetrafluoroethylene usually constitute discontinuities in the material, as the result of which the filled material is adversely affected, especially from the standpoint of strength, as compared with unfilled polytetrafluoroethylene. The weakening of the resin in general has tended to increase with increase in the content of filler employed, as a result of which in many cases where high percentages of filler might otherwise be used to advantage, percentage was limited because of the adverse influence upon one or another of the strength characteristics of the product.

One of the primary objects of the present invention is to greatly reduce and, in some cases, virtually eliminate the adverse influence upon the strength of the material as a result of incorporation of fillers.

Other objects of the invention include making possible incorporation of higher percentages of fillers than has been practicable heretofore, especially with certain types of fillers the particles of which are characterized by relatively smooth surfaces with respect to which polytetrafluoroethylene manifests very poor adhesion. Thus, the invention makes possible incorporation of even relatively high percentages of such fillers as finely divided metals and glass.

In a typical illustrative operation according to the invention, which is here given to facilitate explanation and description, aluminum powder of an average particle size of the order of 10 microns is first mixed with a 50% aqueous dispersion of colloidal particles of polytetrafluoroethylene of average particle size less than 2 microns, for instance of the order of 0.15 micron. In this mixture the polytetrafluoroethylene comprises about 7% by volume of the filler. After stirring to effect thorough interdispersion of the filler and polytetrafluoroethylene, the mixture is precipitated in known manner, is dried, and is then heated to sinter the polytetrafluoroethylene content, the heating being effected at a temperature above the transition point of the polytetrafluoroethylene, for instance at about 700° F. for a period of 1 hour. This sintering is effected with the material in loose form, as by spreading on a tray and placement in a heating oven.

The sintered mixture is quite friable and is broken up to reconstitute the powdered condition of the material, which may readily be done by a mild grinding operation.

The reconstituted powder comprises the original filler particles having coatings of sintered polytetrafluoroethylene, which coatings effectively envelope or encapsulate the individual filler particles. The particles prepared in this way, in effect, constitute a filler having greatly improved filler characteristics.

In a typical operation according to the invention, the thus prepared filler particles are now mixed with an additional amount of a 50% aqueous dispersion of the same type of colloidal polytetrafluoroethylene particles, the quantities intermixed being such as to yield a final mixture containing, for example, 60% of aluminum by volume and 40% of polytetrafluoroethylene (including the polytetrafluoroethylene added in both stages of mixing). This second dispersion is then treated to precipitate the solids, thus yieldling a pasty-type molding powder, which may be pressure formed in various ways to produce products or articles, and finally the pressure formed pieces are sintered by heating to a temperature above the transition temperature of the polytetrafluoroethylene.

From the above it will be seen that, in general, the procedure according to the present invention involves a two stage addition of the polytetrafluoroethylene to the filler, with a sintering operation applied to the resin material incorporated in the first stage, prior to the incorporation of the resin in the second stage of the treatment.

Proceeding according to the present invention, as illustrated by the above described typical sequence of treatments provides for the production of articles or products which, with a given filler and with a given percentage loading, are much stronger than where the same content of the same filler is directly incorporated in the polytetrafluoroethylene in one stage. Moreover, proceeding according to the present invention greatly facilitates formation of the products or articles, as will further appear.

Although not all reasons for the improvements may be fully known or understood, the following explanation of certain factors should be noted.

First, as has already been recognized, poltetrafluoroethylene has relatively poor adhesion properties with respect to many other materials, and notably to metals and other smooth surfaced materials. It has likewise already been well-known that polytetrafluoroethylene particles may be sintered to form a tough and strong resin-type material. The coating or encapsulating action of the first stage of treatment described above, followed by the sintering of the coating provides a tough layer of polytetrafluoroethylene completely or substantially completely surrounding the individual filler particles and therefore tightly bound to the particles. By this treatment, the filler particles, in effect, have been provided with a surface of different character, which surface is mechanically bound to the particles and which surface no longer manifests poor adhesion properties with reference to polytetrafluoroethylene.

In explanation of the action which takes place in the final stages of the treatment according to the invention, it is first noted that sintered particles of polytetrafluoroethylene do not readily adhere to each other unless both heat and pressure are concurrently applied. Thus, theoretically, the coated and sintered filler particles prepared in the first stage of the treatment according to the invention could be further sintered under application of both heat and pressure and in this way an article of some strength could be made. However, the formation of articles or products, such as rods, tape, etc. by techniques requiring both heat and pressure is difficult and time consuming, and is therefore to be avoided if possible.

I have found that the sintered coating of the filler particles displays quite good adhesion properties with reference to unsintered polytetrafluoroethylene, especially when the unsintered material is in colloidal particle form, and that paste extrusion, rolling or calendering, and other pressure forming and pressure molding operations are readily applicable to admixtures of the coated filler particles with unsintered polytetrafluoroethylene. These forming techniques, such as paste extrusion, etc. may be carried out under pressure alone, in the absence of heat and may therefore be conducted at relatively high speed. Although the strength of the pressure formed product or article may not be sufficient for certain uses, nevertheless, it is more than adequate to provide for handling; and in most instances, it is contemplated that after pressure formation of the article or piece, such shapes are thereafter heated for a final sintering operation, which, because of the presence of the unsintered polytetrafluoroethylene, may be done in the absence of pressure notwithstanding the concurrent presence of the sintered material. In this way the full strength of the material is developed. It is also of advantage according to the invention that this final sintering does not require application of pressure during the heating, as sintering in this way is also a more efficient and convenient method of procedure.

Still another advantage of employing the technique of the present invention shows up in connection with certain types of forming operations, notably extrusion. Heretofore, where filled polytetrafluoroethylene material has been used for paste extrusion, the mechanical working of the material during the extrusion operation tends to effect fibration of the resin with orientation of the fibers lengthwise of the axis of extrusion. This tends to develop the strength of the extruded material in a direction lengthwise thereof, but the transverse strength tends to diminish. Moreover, when filler particles are present there is a tendency to develop lengthwise planes or lines of cleavage or discontinuity, with consequent transverse weakening of the ultimate products formed, even in the sintered condition. With the coated and sintered filler particles of the present invention, however, this tendency is greatly diminished, with consequent improvement in strength, especially in a direction transversely of the direction of orientation which the working tends to establish.

In considering ranges of materials, operating conditions and the like, the following should be noted.

First, with respect to the fillers to be employed in accordance with the present invention, the invention is applicable to fillers generally. Materials used as fillers should be available in fine particle form and should preferably constitute materials which remain solids up to a temperature at least as high as the temperature to be employed for sintering the polytetrafluoroethylene. Such fillers should, of course, also be substantially inert with reference to polytetrafluoroethylene. The fillers may be added for a variety of purposes, including contribution of magnetic or electrical properties, pigmentation, lubrication, and they may be added for the purpose of reducing the cost of the material, polytetrafluoroethylene being a relatively expensive resin-type material. Among the many filler materials which may be employed in the practice of the present invention, specific examples are referred to below.

Thus, the invention is applicable to fillers of the metallic types such as aluminum, copper, nickel and iron, especially carbonyl nickel and iron. Glass in finely ground or fine particle form may also be used, as may comminuted asbestos. Still other types of fillers include silica, graphite, talc and carbon black.

The invention is also applicable to the substantially non-crystalline or amorphous synthetic mica filler disclosed in my copending application Serial No. 664,179, filed June 7, 1957. In connection with the amorphous mica filler, it may be mentioned that while some benefit is obtained by coating the particles according to the invention, that particular form of mica is less subject to the disadvantage of developing discontinuities in the material than are most fillers, and especially as compared with the crystalline plate-type of mica which has heretofore been especially troublesome as a filler in polytetrafluoroethylene because of its characteristic tendency to split.

The present invention is of especial advantage in connection with fillers made of the crystalline plate-type of mica, as it markedly decreases the weakening of the resin material which has heretofore been encountered when employing crystalline plate mica.

Although not limited in this respect, the invention is of greatest advantage in connection with any of the fillers the particles of which present smooth surfaces or the surfaces of which are peculiarly non-adherent with respect to polytetrafluoroethylene.

In considering the forms of polytetrafluoroethylene which are useable according to the invention, it is first pointed out that this resin material is available in a number of different forms. For example, it is available in the well-known granular form of molding powder, having an average molecular weight in the order of 5,000,000. This molding powder is also characterized by an average size of the granules (which are agglomerates) of the order of at least several hundred microns, with an average ultimate particle size of the order of 4 or 5 microns.

In another form, polytetrafluoroethylene is available as a suspension or aqueous dispersion, characterized by a molecular weight probably of the order of 500,000 and by an ultimate particle size less than 2 microns, averaging a particle size only a minor fraction of 1 micron, for instance, of the order of about 0.15 micron. These particles are of colloidal character and in the aqueous suspension form the material is available in a concentration of from about 50% to about 65% by weight of resin. The colloidal particles of such a resin may be precipitated or coagulated by known treatment of the aqueous suspensoid to yield, when dried, a somewhat pasty powder; and polytetrafluoroethylene is commercially available in this form also. Still further, the precipitated colloidal pasty powder may be reconstituted with water or with a non-aqueous organic liquid wetting medium, such for example as acetone, alcohols and naphtha, in the manner described in my copending application Serial No. 495,456, filed March 21, 1955, and this dispersion form of the colloidal particles may also be employed in the present invention. Such reconstituted dispersions differ from the original suspensoids, especially in that the particles tend somewhat to form agglomerates.

For the first stage or particle coating step of the present invention, any form of polytetrafluoroethylene which can conveniently be applied to the particles may be used. It is preferred, however, for the first stage, that some colloidal form of the polytetrafluoroethylene should be used, advantageously a dispersion of such colloidal particles, and with most fillers the original aqueous dispersion or suspensoid form is especially preferred. However, with certain particular fillers, such as iron, it is preferred to employ a reconstituted dispersion formed with a non-aqueous medium, because of the tendency for the iron to oxidize in the presence of water.

For the second stage addition of the polytetrafluoroethylene, any of the above forms of the resin may be used. In the preferred practice of the invention, however, colloidal particle polytetrafluoroethylene is employed not only in the particle coating stage but also in the second stage addition of the resin to the filler. One reason for this preference is that the colloidal particle form, in which the particles average less than 2 microns, has better working characteristics, particularly for extrusion purposes, than does the granular form of molding powder. However, it is of advantage that the coated filler of the invention can also be used with the granular form of polytetrafluoroethylene, because the granular form is much less expensive than the colloidal form. Considerable economy may therefore be effected by employing the granular form in the second stage of addition, even where the first stage utilizes the colloidal form.

As between the several colloidal forms of the resin it is preferred to use the original aqueous suspensoid form for the second stage addition, except in the case of certain particular fillers, such as iron which has a tendency to oxidize in the presence of water. With iron, a reconstituted non-aqueous dispersion is preferred.

One reason for preference for the colloidal form in the first stage of addition of the resin according to the invention is that the fine particle size thereof is more effective than the granular form in coating the individual filler particles. With regard to this matter of effectiveness of the coating, it is further pointed out that it is preferred for this same reason to employ filler particles somewhat larger than the particles of polytetrafluoroethylene. Thus, in the case of the colloidal particles which average considerably less than 2 microns, the filler particles are preferably greater than 2 microns in average particle size, desirably from about 10 microns up to about 50 microns, although for many fillers it is preferred not to exceed about 25 microns.

I have also found it preferable in the first or particle coating stage of the technique of this invention to incorporate less than half of the total polytetrafluoroethylene to be added, the balance or major portion being added in the second stage, after sintering of the particle coatings. In coating the filler particles, the amount of polytetrafluoroethylene is desirably from about 1% to about 35% by volume of the filler, depending on certain other factors such as the surface area of the filler particles to be coated. The amount of polytetrafluoroethylene added in the last stage will, of course, depend upon the extent of filler loading desired. The technique of the invention is of advantage almost regardless of the total quantity of filler in relation to resin desired, but the invention is of especial advantage in the region of high percentage loadings, because with the technique of this invention such high percentage loadings can be achieved without the extent of impairment of strength heretofore encountered. Compositions comprising by volume from about 40% even up to about 90% of filler can be prepared according to the invention, the balance being polytetrafluoroethylene (including both the first and second stage additions of the resin).

Wherever sintering operations are used in accordance with the invention, the temperature employed is desirably above about 627° F., for instance, from about 700° F. to about 750° F.

EXAMPLES

In connection with the following examples, a number of conditions, test procedures and other factors were applied in a uniform manner in the various examples, as indicated, and in order to avoid repetition of these matters which are common to a number of the examples, there is here first given information concerning various of the points which are common as between the examples.

Thus, wherever strength figures are referred to in the examples, they are given on an arbitrary scale as measured in pounds by a test according to which a test piece ½" in diameter is supported and, at a uniform measured distance from the support a load is applied and increased until the piece either bends or breaks.

Wherever reference is made to an aqueous suspensoid of polytetrafluoroethylene, reference is made to a dispersion of colloidal polytetrafluoroethylene particles in water, the resin constituting 60% by weight of the total dispersion.

Wherever reference is made to employment of precipitated colloidal polytetrafluoroethylene (or to the precipitated dispersion form of polytetrafluoroethylene) the material referred to is the resin as precipitated from the original aqueous suspensoid thereof of the kind mentioned just above. Moreover, where reference is made to mixing the precipitated colloidal resin with the filler, this was effected in the presence of acetone as dispersion agent and wetter for the resin, the filler being added to this reconstituted dispersion.

Except as otherwise indicated, the test pieces of the examples were made by pressure molding slugs in a cylindrical mold, the slugs being ½" in diameter and being formed under a pressure of 20 tons per square inch. This molding operation was effected without applying heat. After formation of the test slugs they were removed from the mold and then sintered, without applying pressure, at a temperature of about 720° F. for a period of about 1 hour.

Example I

In this example silica particles were used as filler, the particles being ground to a size readily passing through a 325 mesh screen. This filler was added and mixed with an aqueous suspensoid of polytetrafluoroethylene, the quantity of colloidal particles of the resin representing about 6.66% of the filler by volume. The intermixed filler and resin particles were precipitated and were loose sintered and then the sintered material was broken up to reconstitute the powder form of the material.

The coated and sintered molding powder was then added to and mixed with an aqueous suspensoid of polytetrafluoroethylene and the intermixed filler and resin particles were precipitated. The quantities intermixed in this way were such as to yield a precipitated mixture containing 60% by volume of silica and 40% by volume of the resin (including both the first and second stage additions of the resin).

The material prepared in this way was pressure molded to form test slugs, and after removal from the mold, the slugs were sintered and then tested for strength according to the test procedure described above. The test slugs withstood 27 pounds load before breaking.

By way of comparison, the same quantity of the same silica filler was directly mixed with the same aqueous suspensoid of polytetrafluoroethylene in a quantity sufficient to yield an admixture comprising 60% by volume of the filler and 40% by volume of the resin. After precipitation, test slugs were prepared in the same manner as just described and were subjected to the same test and were found to break at 18 pounds load.

Example II

Silica particles were again coated and sintered in exactly the manner described above in connection with Example I. In this case the quantity of resin added in the initial or coating stage was about 23.33% by volume of the quantity of filler employed. The filler particles prepared in this way were then intermixed with precipitated colloidal polytetrafluoroethylene redispersed in acetone, the quantities being such as to yield, after separation of the acetone, a material comprising 30% by volume of filler and 70% by volume of the resin (including both additions thereof).

Test slugs were formed in the manner described and at 60 pounds load the slugs bent, but did not break.

For purposes of comparison, the same quantity of the silica filler was directly admixed with the precipitated colloidal polytetrafluoroethylene redispersed in acetone. After separation of the acetone slugs were formed and subjected to the strength test, and these slugs broke at 49 pounds load.

Example III

Exactly the same procedure was followed as in Example II except that the quantity of resin employed in the initial coating stage was increased to 47% by volume of the filler, the total quantity of resin after the second addition being the same as in Example II. This yielded test slugs which bent at a 57 pound load but did not break.

Example IV

In this example, silica of the same particle size as mentioned above was again used. In the particle coating stage, the amount of resin used was about 6.66% by volume of the amount of filler and after the final admixture of resin, the material comprised about 60% by volume of filler and 40% by volume of resin. In this example precipitated colloidal polytetrafluoroethylene redispersed in acetone was used for both the first stage or coating operation as well as in the final addition of resin. This yielded test slugs which bent at a 40 pound load but did not break.

For purposes of comparison, 60 volume parts of the same filler were directly admixed with the same precipitated colloidal polytetrafluoroethylene, redispersed in acetone, and this admixture yielded test slugs which broke at 25 pounds load.

Example V

In this example, the silica filler coated and sintered as described in Example II was subsequently mixed with the granular form of polytetrafluoroethylene, wetted with acetone, in proportions to yield a final composition containing 30% of silica by volume and 70% of the resin by volume. Test slugs pressure molded from this material withstood a 36 pound load before bending, but they did not break.

Example VI

In this example aluminum powder of particle size readily passing through a 325 mesh screen was first coated and sintered and then mixed with additional polytetrafluoroethylene in the manner and in the amounts referred to in Example I. This yielded test slugs which did not break until a load of 36 pounds was reached.

A portion of the aluminum filled polytetrafluoroethylene prepared in this example was also formed into pieces by paste extrusion, and after the extrusion the pieces were subjected to sintering (in the absence of pressure). This also produced pieces of high strength.

Example VII

The same procedure as in Example I, with the same quantities of filler and resin were employed, except that glass particles were used as the filler. These glass particles were spherical and smooth, and of a particle size of about 28 microns. Test samples bent at a 30 pound load but did not break.

Example VIII

This example illustrates the effectiveness of the present invention when applied to the crystalline plate-type of mica, which ordinarily results in severe weakening of the product, because of the surface characteristics of this filler and the tendency for the particles to split. The particles were of size to pass readily through a 325 mesh screen. The procedure followed was closely similar to that of Example I above, employing the aqueous suspensoid form of polytetrafluoroethylene in both stages. In the first stage the amount of resin added was about 23.33% by volume of the filler, and in the second stage the amount added was sufficient to bring up the total resin to about 70% by volume, the balance being filler. Test samples made of this material did not break until a 24 pound load was reached.

For a comparison, the same quantity of filler was directly introduced into the same quantity of resin. Attempts to prepare test slugs from this material were virtually unsuccessful, as the slugs were badly cracked and broke up so readily that it was not practicable to sinter them.

Example IX

In this example amorphous mica (sintered synthetic fluor phlogopite) was used as filler. The procedure for both stages of addition of polytetrafluoroethylene was the same as in Example I above, and the same quantities were used.

The material was then subjected to some working to develop a fibrous character in the polytetrafluoroethylene, in the manner referred to in my copending application Serial No. 495,456, filed March 21, 1955. This was accomplished by passing the material through a paste extrusion operation. The extruded and fibrated material was then broken up to pass through a 20 mesh screen, and test slugs were pressure molded and sintered from the material prepared in this way.

The test slugs did not break until reaching a 51 pound load.

A composition of the same proportions was prepared by directly admixing the same amorphous mica with the aqueous suspensoid polytetrafluoroethylene, in the same mica to resin proportions. The prepared material was then further treated to induce fibration in the manner just described and sintered test samples broke after applying a 35 pound load.

A portion of the paste extruded material referred to above (without being broken up) was sintered, and it was found that the sintered pieces formed in this way, notwithstanding the fact that the article comprised 60% filler, had strength equivalent to pieces of the same size formed and sintered of granular polytetrafluoroethylene without any filler.

A portion of the paste extruded material referred to above, without breaking up, was subjected to a rolling operation to form tape, and the tape was then sintered. This yielded tape of exceptionally high tensile strength.

I claim:

1. A method for making filled polytetrafluoroethylene shapes, comprising mixing filler particles with a first amount of unsintered polytetrafluoroethylene which polytetrafluoroethylene is in the form of colloidal particles dispersed in a dispersion medium, precipitating the mixture of filler and polytetrafluoroethylene particles from the dispersion, heating the precipitated mixture in loose, uncompacted form to sinter the polytetrafluoroethylene content thereof, thereafter mixing the sintered mixture in finely divided form with an additional amount of unsintered polytetrafluoroethylene in particle form, pressure forming the shapes from the thus mixed materials, and sintering the formed shapes.

2. A method according to claim 1 in which said additional amount of polytetrafluoroethylene comprises colloidal particles of average size less than 2 microns.

3. A method according to claim 1 in which said additional amount of polytetrafluoroethylene comprises colloidal particles of average size less than 2 microns dispersed in a dispersion medium.

4. A method according to claim 1 in which said additional amount of polytetrafluoroethylene comprises colloidal particles of average size less than 2 microns in aqueous dispersion.

5. A method according to claim 1 in which said additional amount of polytetrafluoroethylene comprises particles of average particle size of the order of 4 to 5 microns.

6. A method for incorporating filler particles in polytetrafluoroethylene, comprising mixing the polytetrafluoroethylene stagewise with the filler particles, in one stage the filler particles being mixed with a portion of the polytetrafluoroethylene to be used in particle form and in a succeeding stage the mixture of the first mentioned stage being mixed with another portion of the polytetrafluoroethylene to be used in particle form, and sintering the mixture of the first stage in loose particle form before mixture of the product of the first stage, in finely divided form, with the polytetrafluoroethylene of the second mentioned stage.

7. A method for making filled polytetrafluoroethylene shapes, comprising mixing filler particles with a first amount of polytetrafluoroethylene in particle form, heating the mixture in uncompacted form to sinter the polytetrafluoroethylene content thereof, thereafter mixing the sintered mixture in finely divided form with an additional amount of polytetrafluoroethylene in particle form, and pressure forming the shapes from the thus mixed materials.

8. A method according to claim 7 in which the first amount of polytetrafluoroethylene is from 1% to 35% by volume of the filler, and in which said additional amount of polytetrafluoroethylene is sufficient to yield a final mixture containing by volume from about 40% to 90% of filler and from 60% to 10% of polytetrafluoroethylene.

9. A method according to claim 7 and further including sintering the pressure formed shapes.

10. A method for making polytetrafluoroethylene coated filler particles for incorporation as a filler in unsintered polytetrafluoroethylene, comprising mixing particles of a solid filler material having a softening point higher than the transition temperature of polytetrafluoroethylene with unsintered polytetrafluoroethylene, which polytetrafluoroethylene is in the form of colloidal particles dispersed in a dispersion medium, precipitating the mixture of filler and polytetrafluoroethylene particles from the dispersion, whereby to coat the solid filler material particles with unsintered polytetrafluoroethylene, and heating the thus coated particles in uncompacted form to sinter the polytetrafluoroethylene.

11. A method for making filled polytetrafluoroethylene shapes incorporating the sintered coated filler particles made according to the method of claim 10, comprising mixing the sintered coated filler particles with unsintered polytetrafluoroethylene in particle form, pressure forming shapes from the thus mixed materials, and sintering the formed shapes.

References Cited in the file of this patent
UNITED STATES PATENTS

| | | |
|---|---|---|
| 1,830,489 | Sproat | Nov. 3, 1931 |
| 2,396,629 | Alfthan et al. | Mar. 19, 1946 |
| 2,400,094 | Benning et al. | May 14, 1946 |
| 2,485,691 | Bogese | Oct. 25, 1949 |
| 2,714,077 | Wallace | July 26, 1955 |
| 2,782,180 | Weidman | Feb. 19, 1957 |